US011367278B2

(12) United States Patent
Wilson et al.

(10) Patent No.: US 11,367,278 B2
(45) Date of Patent: Jun. 21, 2022

(54) FIELD SEGMENTATION AND CLASSIFICATION

(71) Applicant: X Development LLC, Mountain View, CA (US)

(72) Inventors: Alex Wilson, Oxford (GB); Christopher Edward Bacon, Leatherhead (GB); Jie Yang, Sunnyvale, CA (US); Cheng-en Guo, Santa Clara, CA (US)

(73) Assignee: X DEVELOPMENT LLC, Mountain View, CA (US)

( * ) Notice: Subject to any disclaimer, the term of this patent is extended or adjusted under 35 U.S.C. 154(b) by 292 days.

(21) Appl. No.: 16/817,937

(22) Filed: Mar. 13, 2020

(65) Prior Publication Data
US 2021/0286998 A1    Sep. 16, 2021

(51) Int. Cl.
*G06V 20/10*    (2022.01)
*G06K 9/62*    (2022.01)
*G06N 3/04*    (2006.01)
*G06V 10/82*    (2022.01)
*G06T 7/12*    (2017.01)

(52) U.S. Cl.
CPC ......... *G06V 20/188* (2022.01); *G06K 9/6267* (2013.01); *G06N 3/0454* (2013.01); *G06T 7/12* (2017.01); *G06V 10/82* (2022.01); *G06T 2207/10032* (2013.01); *G06T 2207/20084* (2013.01); *G06T 2207/30188* (2013.01)

(58) Field of Classification Search
CPC .................. G06V 20/188; G06V 10/82; G06T 7/10–194; G06T 2207/10032; G06T 2207/30188; G06T 2207/20081; G06T 2207/20084; G06N 3/02–088
See application file for complete search history.

(56) References Cited

U.S. PATENT DOCUMENTS

2018/0373932 A1*   12/2018   Albrecht ................ G06V 10/82

OTHER PUBLICATIONS

Persello, Claudio, et al. "Delineation of agricultural fields in smallholder farms from satellite images using fully convolutional networks and combinatorial grouping." Remote sensing of environment 231 (2019): 111253. (Year: 2019).*

(Continued)

*Primary Examiner* — Geoffrey E Summers
(74) *Attorney, Agent, or Firm* — Middleton Reutlinger

(57) ABSTRACT

Implementations relate to improved crop field segmentation and crop classification in which boundaries between crop fields are more accurately detected. In various implementations, high-elevation image(s) that capture an area containing multiple demarcated fields may be applied as input across one or more machine learning models to generate a boundary enhancement channel. Each pixel of the boundary enhancement channel may be spatially aligned with a corresponding pixel of the one or more high-elevation images. Moreover, each pixel of the boundary enhancement channel may be classified with a unit angle to a reference location of the field of the multiple demarcated fields that contains the pixel. Based on the boundary enhancement channel, pixel-wise field memberships of pixels of the one or more high-elevation images in the multiple demarcated fields may be determined.

14 Claims, 7 Drawing Sheets

(56) References Cited

OTHER PUBLICATIONS

Uhrig, Jonas, et al. "Pixel-level encoding and depth layering for instance-level semantic labeling." German Conference on Pattern Recognition. Springer, Cham, 2016. (Year: 2016).*

Bai, Min, and Raquel Urtasun. "Deep watershed transform for instance segmentation." Proceedings of the IEEE conference on computer vision and pattern recognition. 2017. (Year: 2017).*

Chen, Liang-Chieh, et al. "MaskLab: Instance Segmentation by Refining Object Detection with Semantic and Direction Features." 2018 IEEE/CVF Conference on Computer Vision and Pattern Recognition. IEEE, 2018. (Year: 2018).*

Garcia-Pedrero, Angel, et al. "Deep learning for automatic outlining agricultural parcels: Exploiting the land parcel identification system." IEEE Access 7 (2019): 158223-158236. (Year: 2019).*

Cipolla, Roberto, Yarin Gal, and Alex Kendall. "Multi-task Learning Using Uncertainty to Weigh Losses for Scene Geometry and Semantics." 2018 IEEE/CVF Conference on Computer Vision and Pattern Recognition. IEEE, 2018. (Year: 2018).*

Long, Jonathan, Evan Shelhamer, and Trevor Darrell. "Fully convolutional networks for semantic segmentation." 2015 IEEE Conference on Computer Vision and Pattern Recognition (CVPR). IEEE, 2015. (Year: 2015).*

Waldner, François, and Foivos I. Diakogiannis. "Deep learning on edge: extracting field boundaries from satellite images with a convolutional neural network." arXiv preprint arXiv:1910.12023v2 (2020). (Year: 2020).*

Bai, M., et al. "Deep Watershed Transform for Instance Segmentation." arXiv:1611.08303v2 [cs.CV]; 9 pages; May 4, 2017.

Chen, L., et al. "Rethinking Atrous Convolution for Semantic Image Segmentation." arXiv:1706.05587v3 [cs.CV]; 14 pages; Dec. 5, 2017.

Malambo, L., et al. "A Deep Learning Semantic Segmentation-Based Approach for Field-Level Sorghum Panicle Counting." Remote Sensing 2019, 11, 2939; doi:10.3390/rs11242939; www.mdpi.com/journal/remotesensing; 19 pages.

Salman, N. "Image Segmentation Based on Watershed and Edge Detection Techniques." The International Arab Journal of Information Technology; vol. 3, No. 2; pp. 104-110; Apr. 2006.

Simonyan, K., et al. "Very Deep Convolutional Networks For Large-Scale Image Recognition." arXiv:1409.1556v6 [cs.CV]; 14 pages; Apr. 10, 2015.

Tarabalka, Y., et al. "Segmentation and Classification of Hyperspectral Images Using Watershed Transformation." Pattern Recognition, Elsevier, 2010, 43 (7), pp. 2367-2379. 10.1016/j.patcog.2010.01.016. hal-00578860.

Watkins, B. "Agricultural Field Boundary Delineation Using Earth Observation Methods and Multi-Temporal Sentinel-2 Imagery." Stellenbosch University https://scholar.sun.ac.za; 97 pages; Dec. 2019.

* cited by examiner

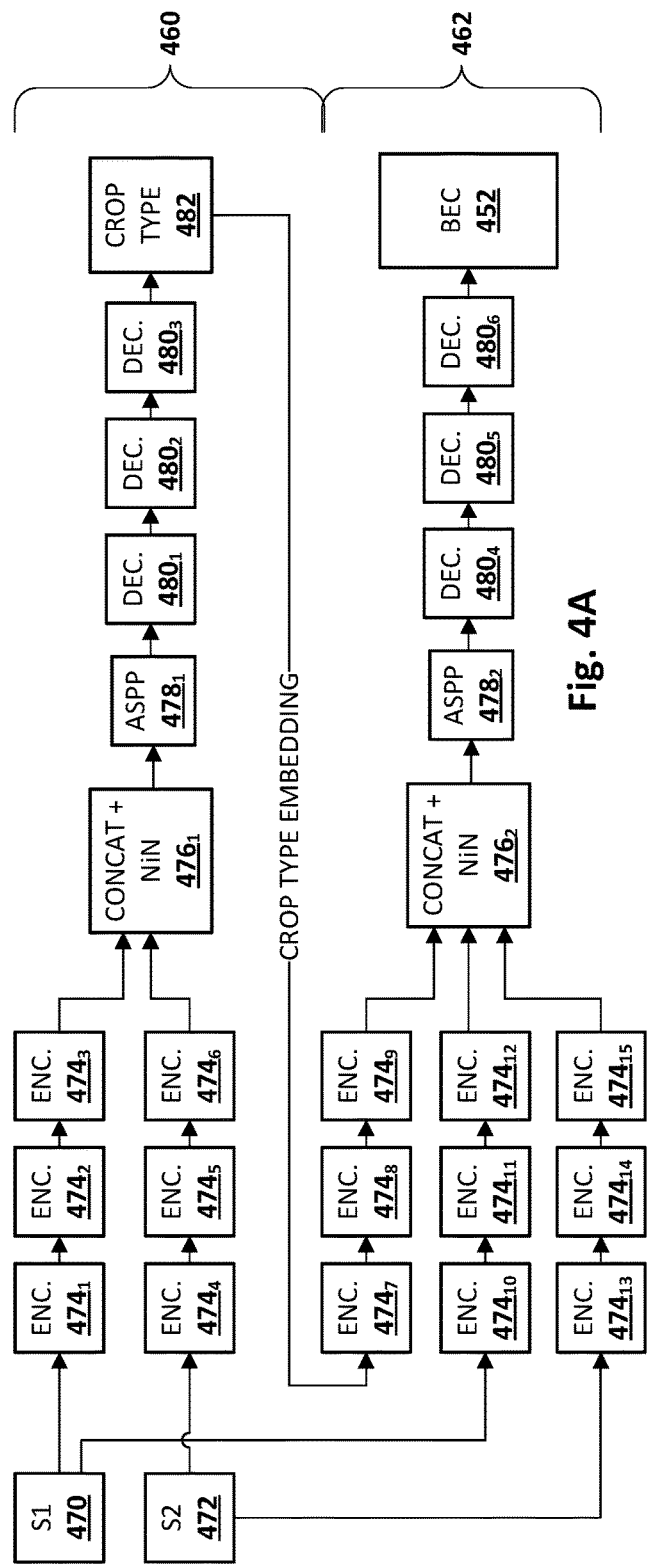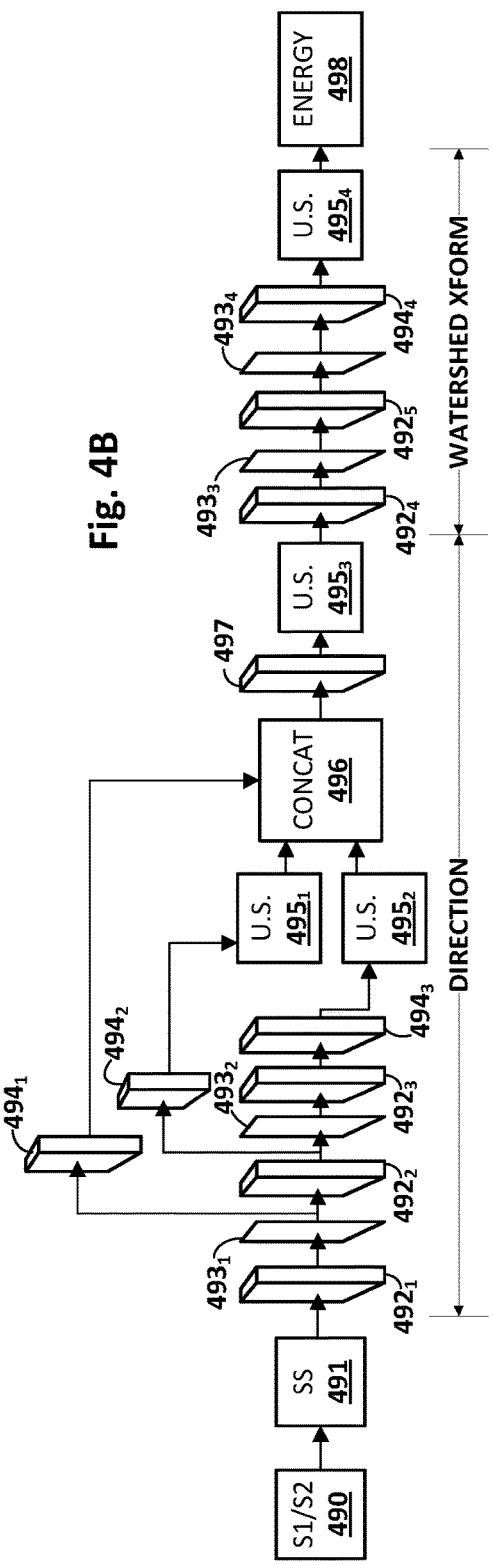

```
┌─────────────────────────────────────────────────────────────┐
│ OBTAIN HIGH-ELEVATION IMAGE(S) THAT CAPTURE AN AREA         │
│ CONTAINING MULTIPLE DEMARCATED FIELDS, WHEREIN THE          │
│ HIGH-ELEVATION IMAGE(S) EACH INCLUDE A PLURALITY OF         │
│ SPECTRAL CHANNELS                                           │
│ 502                                                         │
└─────────────────────────────────────────────────────────────┘
                               │
                               ▼
┌─────────────────────────────────────────────────────────────┐
│ APPLY THE ONE OR MORE HIGH ELEVATION IMAGES AS INPUT        │
│ ACROSS ONE OR MORE MACHINE LEARNING MODELS TO GENERATE      │
│ CROP TYPE CLASSIFICATION OUTPUT                             │
│ 504                                                         │
└─────────────────────────────────────────────────────────────┘
                               │
                               ▼
┌─────────────────────────────────────────────────────────────┐
│ APPLY ONE OR MORE HIGH ELEVATION IMAGES AS INPUT ACROSS     │
│ ONE OR MORE ADDITIONAL MACHINE LEARNING MODELS TO           │
│ GENERATE BOUNDARY ENHANCEMENT CHANNEL                       │
│ 506                                                         │
└─────────────────────────────────────────────────────────────┘
                               │
                               ▼
┌─────────────────────────────────────────────────────────────┐
│ BASED ON BOUNDARY ENHANCEMENT LAYER, DETERMINE PIXEL-WISE   │
│ FIELD MEMBERSHIPS OF PIXELS OF HIGH-ELEVATION IMAGE(S)      │
│ 508                                                         │
└─────────────────────────────────────────────────────────────┘
                               │
                               ▼
┌─────────────────────────────────────────────────────────────┐
│ UPSAMPLE THE BOUNDARY ENHANCEMENT CHANNEL TO ENHANCE        │
│ SPATIAL RESOLUTION OF AT LEAST SOME BOUNDARIES BETWEEN      │
│ THE MULTIPLE DEMARCATED FIELDS                              │
│ 510                                                         │
└─────────────────────────────────────────────────────────────┘
                               │
                               ▼
┌─────────────────────────────────────────────────────────────┐
│ BASED ON PIXEL-WISE FIELD INSTANCE MEMBERSHIPS, GENERATE,   │
│ FOR RENDITION ON A DISPLAY, A MAP THAT VISUALLY ANNOTATES   │
│ THE MULTIPLE DEMARCATED FIELDS                              │
│ 512                                                         │
└─────────────────────────────────────────────────────────────┘
```

```
┌─────────────────────────────────────────────────────────────────────────┐
│ OBTAIN HIGH-ELEVATION IMAGE(S) THAT CAPTURE AN AREA CONTAINING MULTIPLE │
│ DEMARCATED FIELDS, WHEREIN THE HIGH-ELEVATION IMAGE(S) EACH INCLUDE A   │
│                    PLURALITY OF SPECTRAL CHANNELS                       │
│                                  602                                    │
└─────────────────────────────────────────────────────────────────────────┘
                                    │
                                    ▼
┌─────────────────────────────────────────────────────────────────────────┐
│      GENERATE GROUND TRUTH BOUNDARY ENHANCEMENT CHANNEL BASED ON        │
│                        GROUND TRUTH CROP DATA                           │
│                                  604                                    │
└─────────────────────────────────────────────────────────────────────────┘
                                    │
                                    ▼
┌─────────────────────────────────────────────────────────────────────────┐
│    APPLY ONE OR MORE HIGH ELEVATION IMAGES AS INPUT ACROSS ONE OR MORE  │
│   MACHINE LEARNING MODELS TO GENERATE PREDICTED BOUNDARY ENHANCEMENT    │
│                                CHANNEL                                  │
│                                  606                                    │
└─────────────────────────────────────────────────────────────────────────┘
                                    │
                                    ▼
┌─────────────────────────────────────────────────────────────────────────┐
│   COMPARE PREDICTED BOUNDARY ENHANCEMENT CHANNEL WITH GROUND TRUTH      │
│          BOUNDARY ENHANCEMENT CHANNEL TO DETERMINE LOSS                 │
│                                  608                                    │
└─────────────────────────────────────────────────────────────────────────┘
                                    │
                                    ▼
┌─────────────────────────────────────────────────────────────────────────┐
│       BASED ON LOSS, TRAIN ONE OR MORE OF THE MACHINE LEARNING MODELS   │
│                                  610                                    │
└─────────────────────────────────────────────────────────────────────────┘
```

FIELD SEGMENTATION AND CLASSIFICATION

BACKGROUND

Digital images captured from high-elevations, such as satellite images, images captured by unmanned aerial vehicles, or images captured by high-elevation manned aircraft (e.g., space shuttles), are useful for a variety of remote sensing applications, particularly crop field segmentation and crop classification. Crop field segmentation involves assigning each geographic area (e.g., by way of high-elevation imagery pixels in the area) to an instance of a field (e.g., with a field identifier). Crop classification assigns crop type classifications (e.g., corn, soy, strawberries, etc.) to individual units of crops, e.g., corresponding to individual pixels of the high-elevation imagery. However, segmenting distinct crop fields from each other and/or from other surrounding areas using these high-elevation imagery can be a challenge. Boundaries between crop fields are often difficult to discern using existing techniques, and as a result, neighboring fields of different crops often meld into each other.

SUMMARY

The present disclosure is generally directed to methods, apparatus, and computer-readable media (transitory and non-transitory) for improved crop field segmentation and crop classification in which boundaries between crop fields are more accurately detected. In various implementations, high-elevation imagery obtained from various source(s) (e.g., satellite(s), unmanned aerial vehicles, etc.) is used to generate a "boundary enhancement channel." For example, spectral channels of the high-elevation imagery may be applied as input across one or more machine learning models to generate the boundary enhancement channel. The boundary enhancement channel may capture boundaries between crop fields and each other, or between crop fields and other types of areas, more accurately than previous techniques. The boundary enhancement channel may include, for instance, pixel wise classifications of angles to some reference location of the field that contains the pixels. The reference location may be, for instance, a center of mass of the field that contains the pixel or a nearest boundary of the field that contains the pixel.

The machine learning model(s) used to generate the boundary enhancement channel and for other aspects of the present disclosure may take various forms. For example, a first set of one or more convolutional neural networks ("CNN") may be trained to assign pixel-wise crop type classifications. A second set of one or more CNNs may be trained to generate a boundary enhancement channel. In some such implementations, output of the first set may be piped as input to the second set. The boundary enhancement channel may then be processed to determine, and store in memory (e.g., for subsequent rendition on a display), pixel-wise field memberships of pixels of the one or more high-elevation images in multiple demarcated fields.

In some implementations, one or more of the CNNs may implement atrous convolution, e.g., followed by atrous spatial pyramid pooling ("ASPP"), although this is not required. In some implementations, at least some of these machine learning model(s) may be trained using ground truth data that is highly representative of crop field boundaries. These ground truth data may include, for instance, crop data layer ("CDL"), common land unit ("CLU") data, crop map of England ("CROME"), European Union Land Parcel Identification System ("LPIS"), etc.

Techniques described herein may be applied in many applications, including but not limited to agriculture (e.g., crop analysis, crop prediction), environment monitoring, disaster control, and so forth. Techniques described herein also give rise to various technical advantages. For example, conventional techniques for performing image segmentation on satellite data struggle with identifying boundaries between fields. By contrast, techniques described herein more reliably and accurately identify boundaries between distinct fields, and therefore, are more suitable for crop field segmentation and classification.

In some implementations, a computer implemented method may be provided that includes: obtaining one or more high-elevation images that capture an area containing multiple demarcated fields; applying the high-elevation images as input across one or more machine learning models to generate a boundary enhancement channel, wherein each pixel of the boundary enhancement channel is spatially aligned with a corresponding pixel of the one or more high-elevation images, and wherein each pixel of the boundary enhancement channel is classified with a unit angle to a reference location of the field of the multiple demarcated fields that contains the pixel; and based on the boundary enhancement channel, determining, and storing in memory, pixel-wise field memberships of pixels of the one or more high-elevation images in the multiple demarcated fields.

In various implementations, the reference location may include a center of mass of the field that contains the pixel or a nearest boundary of the field that contains the pixel. In various implementations, the one or more machine learning models may include first and second convolutional neural networks in series, wherein output of the first convolutional neural network is applied as input across the second convolutional neural network. In various implementations, the output of one of the first and second convolutional neural networks may include pixel-wise crop type classifications, and output of the other of the first and second convolutional neural networks may include the pixel-wise field memberships. In various implementations, the one or more machine learning models may include an atrous spatial pyramid pooling ("ASPP") layer.

In various implementations, the method may further include upsampling the boundary enhancement channel to enhance spatial resolution of at least some boundaries between the multiple demarcated fields. In various implementations, the one or more machine learning models may be trained using a weighted combination of two or more of cosine loss on boundary unit angles, cross-entropy loss for boundary pixels, and cross-entropy loss for pixel-wise crop type classifications. In various implementations, the determining may include clustering pixels of the boundary enhancement channel together along boundaries where the unit angles align.

In another aspect, a method may include: obtaining one or more high-elevation images that capture an area containing multiple demarcated fields, wherein the one or more high-elevation images each include a plurality of spectral channels; applying the high-elevation images as inputs across one or more machine learning models to generate a boundary enhancement channel, wherein each pixel of the boundary enhancement channel is spatially aligned with a corresponding pixel of the one or more high-elevation images, and wherein each pixel is classified with an angle to a reference location of the field of the multiple demarcated fields that contains the pixel; comparing the boundary enhancement channel to ground truth segmentation data; and based on the comparing, training one or more of the machine learning models. In various implementations, the ground truth segmentation data comprises one or more of crop data layer ("CDL") data, common land unit ("CLU") data, crop map of England ("CROME") data, or European Union Land Parcel Identification System ("LPIS") data.

Other implementations may include a non-transitory computer readable storage medium storing instructions executable by a processor to perform a method such as one or more of the methods described above. Yet another implementation may include a system including memory and one or more processors operable to execute instructions, stored in the memory, to implement one or more modules or engines that, alone or collectively, perform a method such as one or more of the methods described above.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIGS. 4A and 4B schematically depict example machine learning architectures for practicing selected aspects of the present disclosure.

FIG. 5 depicts a flow chart illustrating an example method of practicing selected aspects of the present disclosure related to inference, in accordance with various implementations.

FIG. 6 depicts a flow chart illustrating an example method of practicing selected aspects of the present disclosure related to training, in accordance with various implementations.

DETAILED DESCRIPTION

Figure 1:
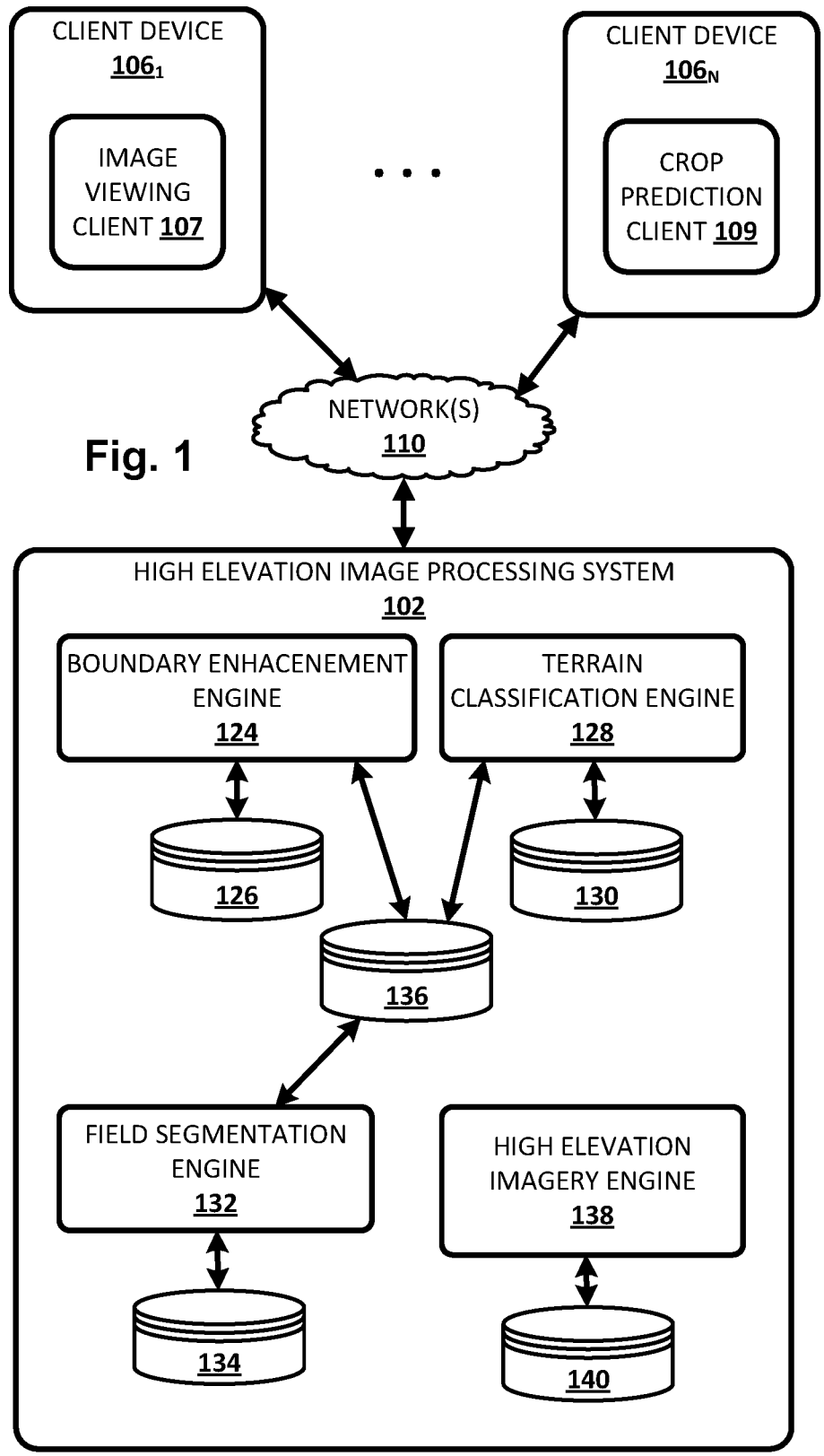
FIG. 1 schematically illustrates an example environment in selected aspects of the present disclosure may be implemented, in accordance with various implementations.

FIG. 1 illustrates an environment in which one or more selected aspects of the present disclosure may be implemented, in accordance with various implementations. The example environment includes a plurality of client devices $106_{1-N}$ and a high elevation digital image processing system 102. High elevation digital image processing system 102 may be implemented in one or more computers (e.g., blade servers) that communicate, for example, through a local area network. High elevation digital image processing system 102 is an example of an information retrieval system in which the systems, components, and techniques described herein may be implemented and/or with which systems, components, and techniques described herein may interface. Each client device 106 and high elevation digital image processing system 102 may include one or more memories for storage of data and software applications, one or more processors for accessing data and executing applications, and other components that facilitate communication over a network. The operations performed by each client device 106 and/or high elevation digital image processing system 102 may be distributed across multiple computer systems.

A user may interact with high elevation digital image processing system 102 via a client device 106. Each client device 106 may be a computer coupled to the high elevation digital image processing system 102 through one or more networks 110 such as a local area network ("LAN") or wide area network ("WAN") such as the Internet. Each client device 106 may be, for example, a desktop computing device, a laptop computing device, a tablet computing device, a mobile phone computing device, a computing device of a vehicle of the participant (e.g., an in-vehicle communications system, an in-vehicle entertainment system, an in-vehicle navigation system), a standalone interactive speaker (with or without a display), or a wearable apparatus of the participant that includes a computing device (e.g., a watch of the participant having a computing device, glasses of the participant having a computing device). Additional and/or alternative client devices may be provided.

Each client device 106 may operate a variety of different applications that may be used, for instance, to view high-elevation digital images that are processed using techniques described herein to segment and classify multiple demarcated fields in an area captured in the high-elevation digital images. For example, a first client device $106_1$ operates an image viewing client 107 (e.g., which may be standalone or part of another application, such as part of a web browser). Another client device $106_N$ may operate a crop prediction application 109 that utilizes high-elevation digital images processed using techniques described herein to make various agricultural predictions and/or recommendations. Part of crop prediction and/or recommendation may include segmenting and classifying different demarcated fields from each other first.

In various implementations, high elevation digital image processing system 102 may include a boundary enhancement engine 124, a terrain classification engine 128, a field segmentation engine 132, and/or a high-elevation imagery engine 138. In some implementations one or more of engines 124, 128, 132, and/or 138 may be omitted. In some implementations all or aspects of one or more of engines 124, 128, 132, and/or 138 may be combined. For example, boundary enhancement engine 124 and field segmentation engine 132 may be combined as a single component. In some implementations, one or more of engines 124, 128, 132, and/or 138 may be implemented in a component that is separate from high elevation digital image processing system 102. In some implementations, one or more of engines 124, 128, 132, and/or 138, or any operative portion thereof, may be implemented in a component that is executed by client device 106.

Boundary enhancement engine 124 may be configured to generate a "boundary enhancement channel." As its name suggests, a boundary enhancement channel may be usable with techniques described herein to assist in emphasizing demarcations between different terrains—and particularly between different crop fields—to facilitate field segmentation by field segmentation engine 132. In some implementations, boundary enhancement engine 124 may be operably coupled with an index 126 that stores, for instance, functions, machine learning models, object code libraries, or other tools that can be used by boundary enhancement engine 124 to generate boundary enhancement channels.

Figure 2:
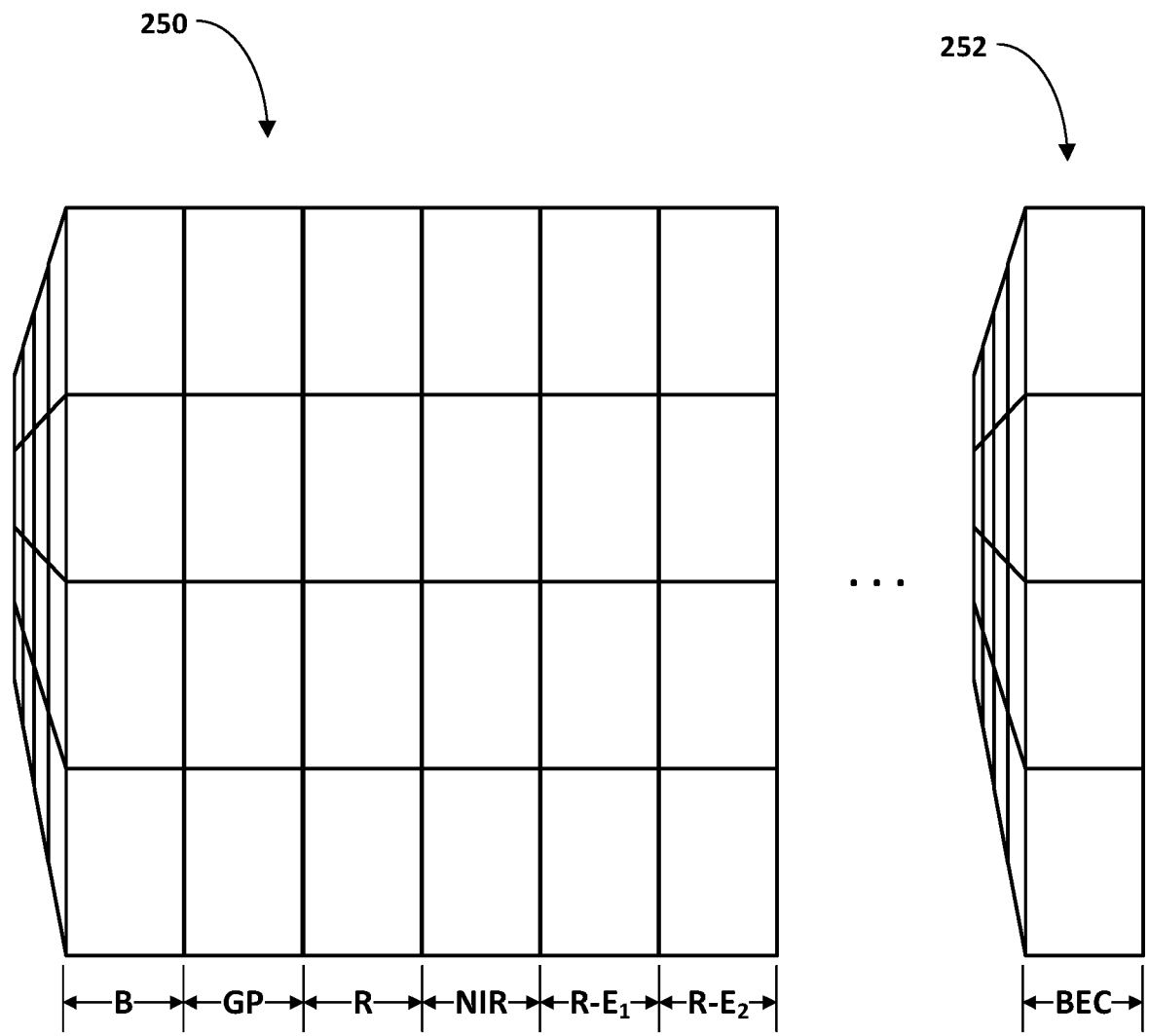
FIG. 2 schematically depicts an example of multi-channel imagery that has been augmented with a boundary enhancement channel, in accordance with various implementations.

In some implementations, each pixel of the boundary enhancement channel may be spatially aligned with a corresponding pixel of the existing high-elevation imagery. Additionally, each pixel of the boundary enhancement channel may be classified with an angle to a reference location of a demarcated field that contains the pixel. This reference location to which the angle points may be, for instance, a center of mass of the demarcated field that contains the pixel, a nearest boundary of the demarcated field that contains the pixel, and so forth. FIG. 2 schematically illustrates one example of how a boundary enhancement channel may relate to existing multi-spectral-channel digital imagery.

In some implementations, terrain classification engine 128 may be configured to classify individual pixels, or individual geographic units that correspond spatially with the individual pixels, into one or more "terrain classifications." Terrain classifications may be used to label pixels by what they depict. Non-limiting examples of terrain classifications include but are not limited to "buildings," "roads," "water," "forest," "crops," "vegetation," "sand," "ice," "mountain," "tilled soil," and so forth. Terrain classifications may be as coarse or granular as desired for a particular application. For example, for agricultural monitoring it may be desirable to have numerous different terrain classifications for different types of crops, such as soy, corn, alfalfa, beans, strawberries, wheat, barley, peas, various grains, various legumes, etc. For city planning it may be desirable to have numerous different terrain classifications for different types of buildings, roofs, streets, parking lots, parks, etc. Particular emphasis will be placed on crop field classification in examples of the present disclosure, but this is not meant to be limiting.

Terrain classification engine 128 may employ a variety of different techniques to classify individual geographic units into various terrain classifications. Some techniques may utilize supervised or unsupervised machine learning that includes trained machine learning models stored, for instance, in index 130. These techniques may include but are not limited to application of multivariate statistics to local relief gradients, fuzzy k-means, morphometric parameterization and artificial neural networks, encoder-decoder networks, and so forth. One example of a machine learning architecture for performing terrain/crop type classification is referenced at 460 of FIG. 4A. Other techniques may not utilize machine learning.

Field segmentation engine 132 may be configured to segment demarcated fields from each other in high-elevation imagery. In some implementations, field segmentation engine 132 may process the boundary enhancement channel generated by boundary enhancement engine 124 to segment high-elevation imagery into distinctly demarcated fields. Field segmentation engine 132 may employ machine learning and/or heuristics (e.g., post-processing) to ascertain, from unit angles contained in a boundary enhancement channel, pixel-wise field memberships of high-elevation imagery. In some implementations, these models and/or heuristics may be stored in an index 134.

High elevation imagery engine 138 may be configured to collect, from various different sources of high elevation imagery, high elevation images. High elevation imagery engine 138 may store these collected high elevation images in an index 140. The sources of the high elevation imagery may include, but are not limited to, satellites, unmanned aerial vehicles (e.g., "drones"), manned aerial vehicles (e.g., balloons, airplanes), and so forth. The satellites may include, but are not limited to, the moderate resolution imaging spectroradiometer ("MODIS") satellite deployed by the National Aeronautics and Space Administration ("NASA"), and/or the Sentinel-1 and Sentinel-2 satellites deployed by the European Space Agency ("ESA"). Satellite imagery may also be obtained, for instance, from the National Agriculture Imagery Program ("NAIP") administered by the United States Department of Agriculture's ("USDA") Farm Service Agency ("FSA"), from the Landsat program administered by NASA, and so forth.

In this specification, the term "database" and "index" will be used broadly to refer to any collection of data. The data of the database and/or the index does not need to be structured in any particular way and it can be stored on storage devices in one or more geographic locations. Thus, for example, the indices 126, 130, 134, 136, and 140 may include multiple collections of data, each of which may be organized and accessed differently.

Training index 136 may be operably coupled to multiple components of high elevation image processing system 102, such as boundary enhancement engine 124, terrain classification engine 128, and/or field segmentation engine 132. Training index 136 may include various ground truth data that is used to train one or more machine learning models described herein. For example, in some implementations, index 136 may include ground truth crop classification and/or segmentation data collected, administered, and/or provided by various entities and/or governments. This ground truth crop classification and/or segmentation data may include, but is not limited to, cropland data layer ("CDL"), Common Land Unit ("CLU"), the European Union ("EU") Land Parcel Identification System ("LPSI"), the Canadian Annual Crop Inventory ("CACI"), the Ordinance Survey ("OS") MasterMap provided by Great Britain, and so forth.

Raw CLU data in particular may be helpful to train a model to detect crop field boundaries. Accordingly, in some implementations, boundary enhancement engine 124 and/or field segmentation engine 132 may utilize CLU data, alone or in combination with other data such as raw CDL data, to train one or more machine learning models that are employed herein. Raw CDL data may be particularly useful for training a model to detect crop types. Accordingly, in some implementations, terrain classification engine 128 may utilize CDL data, alone or in combination with other data such as raw CLU data, to train one or more machine learning models that are employed herein.

FIG. 2 schematically illustrates an example high-elevation digital image 250 that includes a plurality of spectral channels (also referred to as "spectral bands", each represented as a column in FIG. 2), each including a four-by-four matrix of pixels. In this example the spectral channels include blue ("B"), green peak ("GP"), red ("R"), near infrared ("NIR"), red edge one ("R-$E_1$"), red edge two ("R-E2"), and so on, but this is not meant to be limiting. The spectral channels that are available may depend on the source of high elevation digital image 250. It can be seen that individual pixels represented by cubes in each band are spatially aligned with corresponding pixels in the other bands. In this example, the resolution of high elevation digital image 250 is four-by-four for the purpose of brevity. In real-world application the resolution would likely be much higher, e.g., 256×256 pixels with each pixel corresponding to an area of, for instance, ten meters squared.

A boundary enhancement channel ("BEC") 252 has been generated, e.g., by boundary enhancement engine 124. Boundary enhancement channel 252 is depicted adjacent high-elevation digital image 250 to demonstrate how the pixels spatially align. In various implementations, the high-elevation digital image 250 may be applied, e.g., by boundary enhancement engine 124, as input across one or more machine learning models (e.g., stored in index 126) to generate boundary enhancement channel 252. This boundary enhancement channel may in turn be used, e.g., by field segmentation engine 132, to determine (and store in memory such as a display buffer for rendition on a display) pixel-wise field membership of high-elevation imagery. For example, the stored pixel-wise memberships could be used to render on a display a map that visually annotates multiple demarcated fields. In some implementations, the output generated by field segmentation engine 132 may comprise pixel-wise identifiers, with each identifier assigning the respective pixel membership into a particular instance of a demarcated field. Thus, for instance, pixels belonging to (i.e. members of) a first field may be identified with the identifier 000001, pixels belonging to a second field may be identified with the identifier 000002, and so on.

Boundary enhancement channel 252 may be generated by boundary enhancement engine 124 in various ways. In some implementations, boundary enhancement engine 124 may employ a segmentation algorithm such as watershed, or neural network segmentation such as one or more CNNs, e.g., Mask R-CNN, U-net, etc. Many of these techniques may lead to unstable results, however. Alternatively, some sources of high-elevation imagery, such as Sentinel-1 and Sentinel-2, include in their data signal(s) for crop-type classification that can also be leveraged for crop field segmentation. But some of these data may be obscured at least some of the time by transient obstructions such as clouds, so temporal sequences of these data may be beneficial.

Accordingly, in some implementations, boundary enhancement engine 124 may implement a multi-stage CNN to generate a boundary enhancement channel, which can then be used by field segmentation engine 132 to perform field instance segmentation. Rather than training the CNNs to learn boundaries, the CNNs may be trained to learn instance membership of pixels into demarcated fields (or other areas as the case may be). For example, in some implementations, one or more CNNs may be trained to generate pixel-wise classifications of angles to a reference location of the field that contains the pixel, such as the nearest boundary to the pixel, the center of mass, etc. In some such implementations, techniques such as cosine loss may be employed to learn (and infer) boundaries where these pixel-wise angles are pointing at about or exactly 180 degrees from one another, thereby providing a clear loss for purposes of training the one or more CNNs.

Figure 3A:
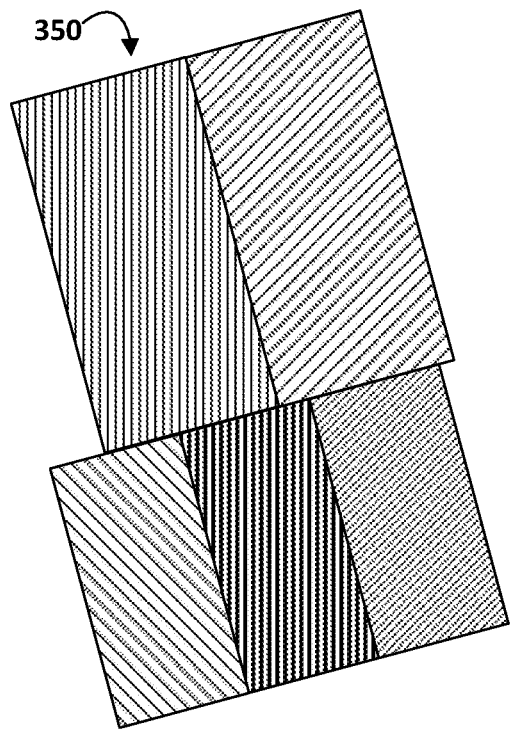
FIGS. 3A and 3B depict one example of how high elevation imagery may be used to generate a boundary enhancement channel, in accordance with various implementations.
Figure 3B:
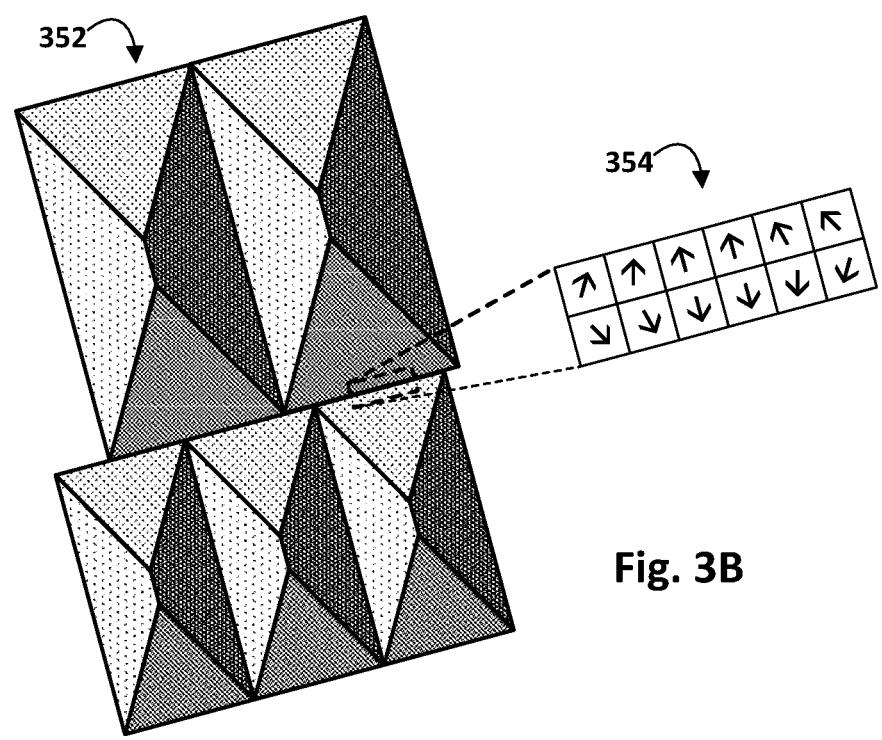

FIGS. 3A and 3B depict one example of how high-elevation imagery 350 may be processed using techniques described herein to generate a boundary enhancement channel 352. FIG. 3A schematically depicts five demarcated fields, each having a different shading. One field may be for one crop, another field may be for another crop, another field (or area) may be for a non-crop (e.g., parking lot), and so forth. FIG. 3B depicts boundary enhancement channel 352 as it might appear if rendered by a visual output device. In particular, pixels in each of the fields that were visible in high-elevation imagery 350 have been processed to generate watershed patterns.

A call-out 354 in FIG. 3B demonstrates how pixel-wise angles at a boundary between two fields may be classified. It can be seen that opposing pixels in the middle point straight towards the respective centers of mass of the corresponding fields. Pixels to either side of these center pixels are slightly angled so that they too point to the respective centers of mass of the corresponding fields. In some cases, particularly where a field has an irregular shape such that its center of mass lies outside its boundary, angles to nearests boundaries may be used instead. Accordingly, the angles shown in FIG. 3B should not be taken as limiting.

FIG. 4A schematically illustrates one non-limiting example of a machine learning architecture that can be implemented in order to carry out selected aspects of the present disclosure. The machine learning architecture of FIG. 4A includes a crop type classification stage 460 and a boundary enhancement stage 462. In some implementations, crop type classification stage 460 may be implemented by terrain classification engine 128. Boundary enhancement stage 462 may be implemented by boundary enhancement engine 124 to create the boundary enhancement channel 452 (252, 352 in previous figures). In some implementations, including that depicted in FIG. 4A, output (482) of the crop type classification stage 460 may be provided as an input to boundary enhancement stage 462, as will be described shortly. Accordingly, crop (or more generally, terrain) type classification is leveraged for crop field segmentation. In other implementations, the reverse could be true; crop field segmentation could be leveraged for terrain type classification.

In this example, high elevation imagery is obtained from two sources, Sentinel-1 ("S1") 470 and Sentinel-2 ("S2") 472, but this is not meant to be limiting. High elevation imagery may be provided by one or more sources that include one or both of Sentinel-1 and Sentinel-2, or any combination of other sources of high-elevation imagery. High-elevation images from S1 470 are applied as input across a series of three encoders, $474_{1-3}$. Each decoder 474 may be, for instance, a Linknet encoder (e.g., a CNN) or other types of encoders. Similarly, high-elevation images from S2 472 are also applied as input across another series of three encoders, $474_{4-6}$. While series of three encoders 474 are depicted in FIG. 4A, this is not meant to be limiting, and other numbers and/or arrangement of encoders may be employed.

In some implementations, the respective embeddings generated by the series of encoders $474_{1-3}$ and $474_{4-6}$ may be combined via a first instance of concatenation and a network-in-network ("NiN") $476_1$ prior to being processed by a first ASPP module/layer $478_1$. The output of ASPP module/layer $478_1$ may then be applied as input to a series of three decoders $480_{1-3}$. Similarly to encoders 474, decoders $480_{1-3}$ and elsewhere in FIG. 4A may be LinkNet decoders (e.g., CNNs) or other types of decoders. And while series of three decoders $480_{1-3}$ are depicted in FIG. 4A, this is not meant to be limiting, and other numbers and/or arrangement of decoders may be employed.

The decoded output 482 of the series of three decoders $480_{1-3}$ may represent a crop type classification 482 during inference or a crop type classification loss during training. Crop type classification 482 may be, for instance, a pixel-wise crop type embedding. This pixel-wise crop type embedding may be used, e.g., by way of a softmax or similar layer, to determine crop type (or more generally, terrain type) probabilities for each pixel, or to drive a cost function for crop type classification stage 460 during training. In some implementations, however, this crop type embedding is applied directly as input for boundary enhancement stage 462, as shown in FIG. 4.

In FIG. 4A, the pixel-wise crop type embedding is applied as input across another series of three (but can be more or less) encoders $474_{7-9}$ that form part of boundary enhancement stage 462 Meanwhile, data from S1 470 and S2 472 is also applied across additional respective series of encoders, $474_{10-12}$ and $474_{13-15}$, respectively. The three embeddings generated by these three additional series of encoders ($474_{1-9}$, $474_{10-12}$, and $474_{13-15}$) may then be combined via a second instance of concatenation and NiN $476_2$ prior to being processed by a second ASPP module/layer $478_2$.

Similar to the crop type classification stage 460, the output of second ASPP module/layer $478_2$ may then be applied as input to another series of three decoders $480_{4-6}$. Again, while series of three decoders $480_{4-6}$ are depicted in FIG. 4A, this is not meant to be limiting, and other numbers and/or arrangement of decoders may be employed. The decoded output of the series of three decoders $480_{4-6}$ may represent pixel-wise unit angle classifications of the boundary enhancement channel 452 during inference (or unit angle losses during training).

In some implementations, various post-processing techniques may be performed to derive crop field instance membership from these pixel-wise unit angle classifications of boundary enhancement channel 452. For example, in some implementations, each pixel's unit angle (or direction) may be followed back recursively to an internal summit or ridge (e.g., center of mass). In some implementations, the post processing may include clustering pixels together along boundaries where the pixel-wise unit angles align (e.g., rather than on true boundaries where those unit angles will be at 180 degrees from each other). These clustered pixels may be deemed members of the same crop field instance (or segment).

In some implementations, for a given cluster of member pixels, a maximum crop type probability for the member pixels may be determined. For example, a mean of the crop type probability distributions the member pixels may be determined. Then, the arguments of the maxima ("argmax") may be determined. Instances of pixels having non-crop (e.g., background) types may be discarded in some implementations.

Pixels at the edge of one image may have less spatial context than pixels in the middle of an image. Accordingly, in some implementations, inference results may be "tiled" or "mosaiced" over a wider image, with instances being merged over boundaries where necessary. Doing so allows edge pixels to be analyzed with more spatial context provided by neighboring images.

FIG. 4B depicts an alternative architecture that may be implemented instead of boundary enhancement stage 462 in FIG. 4A. Although not depicted in FIG. 4B, in some implementations the architecture depicted in FIG. 4B may also receive, as input, the crop type embedding generated from crop type classification stage 460 in FIG. 4A. In FIG. 4B, the architecture includes a "DIRECTION" stage on the left and a "WATERSHED TRANSFORM (XFORM)" stage on the right. The direction stage at left estimates the direction of descent of watershed energy at each pixel. The watershed stage at right receives as input the output of the direction stage, and produces a discretized modified watershed transform energy map.

In the direction stage, high elevation imagery 490 from, for instance, Sentinel-1 and/or Sentinel-2 may be first be gated by semantic segmentation ("SS") 491 and then applied across an arrangement of functions/layers that includes CNNs $492_{1-3}$, pooling layers $483_{1-2}$, fully connected layers $494_{1-3}$, upsampling functions $495_{1-3}$, a concatenation function 496, and a fusion function 497. The output from the direction stage of the left may be input to the watershed transform stage on the right. The watershed transform stage on the right may include additional CNNs $492_{4-5}$, additional pooling layers $493_{3-4}$, another fully connected layer 4944, and another upsampling function 4954. The output of the watershed transform stage may be an energy map 498.

Referring now to FIG. 5, one example method 500 of performing selected aspects of the present disclosure during an inference stage is described. For convenience, the operations of the flow chart are described with reference to a system that performs the operations. This system may include various components of various computer systems, including various engines described herein. Moreover, while operations of method 500 are shown in a particular order, this is not meant to be limiting. One or more operations may be reordered, omitted or added.

At block 502, the system, e.g., by way of high-elevation imagery engine 138, may obtain one or more high-elevation images that capture an area containing multiple demarcated fields. The one or more high-elevation images may each include a plurality of spectral channels, e.g., similar to those depicted in FIG. 2 or different. These one or more high elevation images may be obtained, e.g., by high-elevation imagery engine 138, from index 140 and/or directly from one or more sources, such as the various satellites mentioned previous, an aerial drone, a balloon, etc.

At block 504, the system, e.g., by way of terrain classification engine 128 (e.g., as part of crop type classification stage 460 of FIG. 4A), may apply the one or more high elevation images as input across one or more machine learning models (e.g., stored in index 130) to generate crop type classification output. In other implementations, non-machine learning-based approaches may be employed. In some implementations, such as that depicted in FIG. 4A, the crop type classification output may take the form of a pixel-wise embedding. This pixel-wise embedding (e.g., feature vector) may be usable, e.g., by a downstream softmax layer, to determine probabilities of a defined plurality of terrain (e.g., crop) types. In some implementations, the softmax logits and/or terrain type probabilities are bypassed (e.g., there is no softmax layer), and instead the pixel-wise embedding is piped downstream to the boundary enhancement stage 462.

At block 506, the system, e.g., by way of boundary enhancement engine 124, may generate a boundary enhancement channel such as 252 depicted in FIG. 2, 352 depicted in FIG. 3B, or 452 depicted in FIG. 4A. In some implementations, this may involve applying the high-elevation image(s) as input across one or more additional machine learning models, such as those depicted as part of boundary enhancement stage 462 in FIG. 4A, or those depicted in FIG. 4B. Other types of machine learning models and/or architectures are also contemplated. In various implementations, each pixel of the boundary enhancement channel may be spatially aligned with a corresponding pixel of the one or more high-elevation images, as shown in FIG. 2. Additionally, each pixel may be classified in some implementations with an angle to a reference location of the field of the multiple demarcated fields that contains the pixel. This reference location may be, for instance, a center of mass of the field that contains the pixel or a nearest boundary of the field that contains the pixel.

Based on the boundary enhancement channel, at block 508, the system, e.g., by way of field segmentation engine 132, may determine, and store in memory, pixel-wise field memberships of pixels of the one or more high-elevation images in the multiple demarcated fields. In some implementations, at block 510, the system may upsample the boundary enhancement channel, e.g., to enhance spatial resolution of at least some boundaries between the multiple demarcated fields. Based on the pixel-wise memberships, at block 512, the system may generate, for rendition on a display of a client device 106, a map that visually annotates the multiple demarcated fields.

Referring now to FIG. 6, one example method 600 of performing selected aspects of the present disclosure to train one or more of the machine learning networks described herein (e.g., encoders $474_{1-15}$, decoders $480_{1-6}$, NiN $476_{1-2}$, ASPP $478_{1-2}$) is described. For convenience, the operations of the flow chart are described with reference to a system that performs the operations. This system may include various components of various computer systems, including various engines described herein. Moreover, while operations of method 600 are shown in a particular order, this is not meant to be limiting. One or more operations may be reordered, omitted or added.

Block 602 may be substantially similar to block 502 of FIG. 5, except that during training there is accompanying ground truth training data (e.g., CDU, CLU) available, e.g., in training index 136, that demarcates and/or classifies the different crop fields depicted in the high elevation imagery. Based on this ground truth data, at block 604, the system may generate a ground truth boundary enhancement channel.

At block 606, the system may apply one or more of the high elevation images as input across one or more machine learning models, such as those depicted in FIGS. 4A-B, to generate a predicted boundary enhancement channel. These operations are similar to those performed at block 506, except because the model(s) are not yet trained, the boundary enhancement channel may not appear intelligible.

At block 608, the system may compare the predicted boundary enhancement channel to the ground truth boundary enhancement channel to determine a loss. Based on this loss, at block 610, the system may train one or more of the machine learning models. For example, to the extent there is a loss at the output of the boundary enhancement stage 462 (boundary enhancement channel 452 or its constituent unit angles), that loss may be used to perform techniques such as gradient descent and back propagation to train machine learning models such as encoders $474_{7-15}$, NiN $476_2$, ASPP $478_2$, and decoders $480_{4-6}$.

Figure 7:
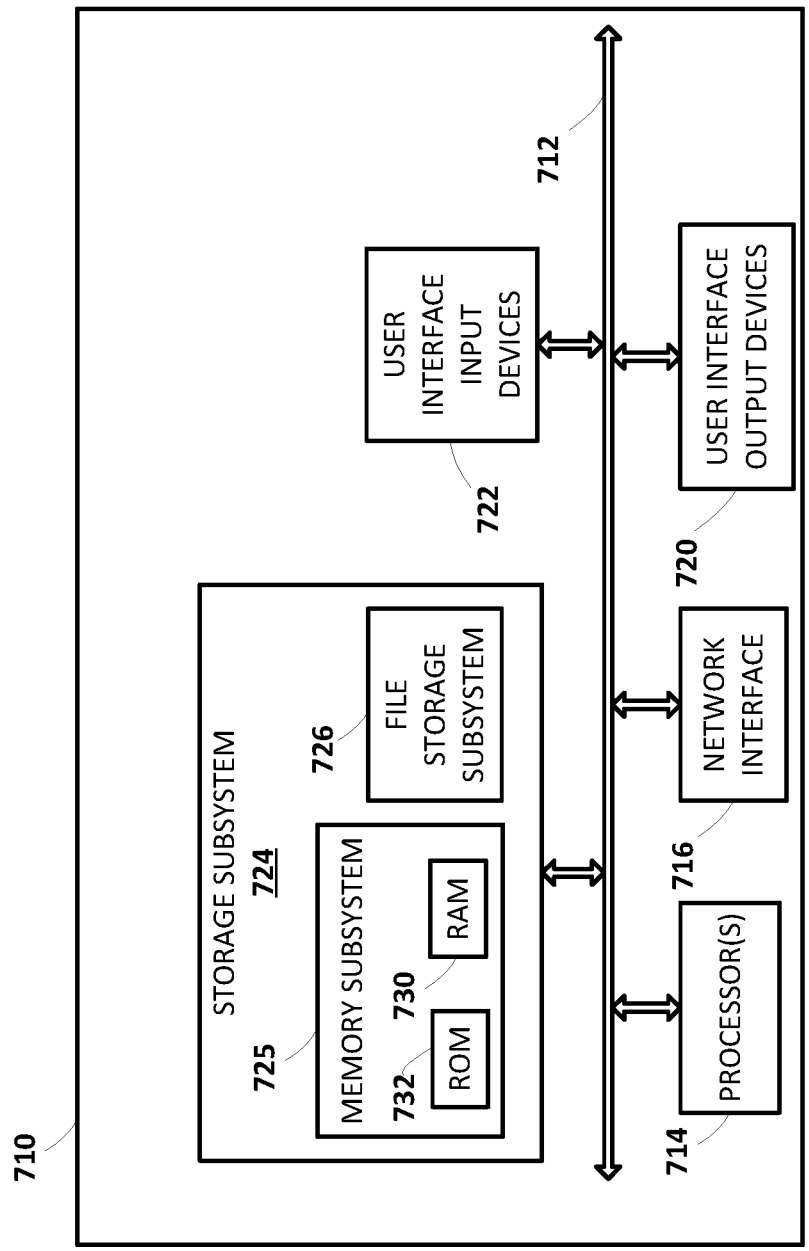
FIG. 7 schematically depicts an example architecture of a computer system.

FIG. 7 is a block diagram of an example computer system 710. Computer system 710 typically includes at least one processor 714 which communicates with a number of peripheral devices via bus subsystem 712. These peripheral devices may include a storage subsystem 724, including, for example, a memory subsystem 725 and a file storage subsystem 726, user interface output devices 720, user interface input devices 722, and a network interface subsystem 716. The input and output devices allow user interaction with computer system 710. Network interface subsystem 716 provides an interface to outside networks and is coupled to corresponding interface devices in other computer systems.

User interface input devices 722 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 710 or onto a communication network.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 710 to the user or to another machine or computer system.

Storage subsystem 724 stores programming and data constructs that provide the functionality of some or all of the modules described herein. For example, the storage subsystem 724 may include the logic to perform selected aspects of the methods described herein, and/or to implement one or more components depicted in prior figures.

These software modules are generally executed by processor 714 alone or in combination with other processors. Memory 725 used in the storage subsystem 724 can include a number of memories including a main random access memory (RAM) 730 for storage of instructions and data during program execution and a read only memory (ROM) 732 in which fixed instructions are stored. A file storage subsystem 726 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 726 in the storage subsystem 724, or in other machines accessible by the processor(s) 714.

Bus subsystem 712 provides a mechanism for letting the various components and subsystems of computer system 710 communicate with each other as intended. Although bus subsystem 712 is shown schematically as a single bus, alternative implementations of the bus subsystem may use multiple busses.*

Computer system 710 can be of varying types including a workstation, server, computing cluster, blade server, server farm, or any other data processing system or computing device. Due to the ever-changing nature of computers and networks, the description of computer system 710 depicted in FIG. 7 is intended only as a specific example for purposes of illustrating some implementations. Many other configurations of computer system 710 are possible having more or fewer components than the computer system depicted in FIG. 7.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented using one or more processors, comprising:
obtaining one or more satellite images that capture an area containing multiple demarcated fields;
applying the satellite images as input across one or more machine learning models to generate a boundary enhancement channel, wherein each pixel of the boundary enhancement channel is spatially aligned with a corresponding pixel of the one or more satellite images, and wherein each pixel of the boundary enhancement channel is classified with a unit angle to a reference location of the field of the multiple demarcated fields that contains the pixel, wherein the reference location comprises a nearest boundary of the field that contains the pixel; and
based on the boundary enhancement channel, determining, and storing in memory, pixel-wise field memberships of pixels of the one or more satellite images in the multiple demarcated fields.

2. The method of claim 1, further comprising upsampling the boundary enhancement channel to enhance spatial resolution of at least some boundaries between the multiple demarcated fields.

3. The method of claim 1, wherein the determining comprises clustering pixels of the boundary enhancement channel together along boundaries where the unit angles align.

4. A system comprising one or more processors and memory storing instructions that, in response to execution of the instructions by the one or more processors, cause the one or more processors to:
obtain one or more satellite images that capture an area containing multiple demarcated fields;
apply the satellite images as input across one or more machine learning models to generate a boundary enhancement channel, wherein each pixel of the boundary enhancement channel is spatially aligned with a corresponding pixel of the one or more satellite images, and wherein each pixel of the boundary enhancement channel is classified with a unit angle to a reference location of the field of the multiple demarcated fields that contains the pixel, wherein the reference location comprises a nearest boundary of the field that contains the pixel; and
based on the boundary enhancement channel, determine, and store in the memory, pixel-wise field memberships of pixels of the one or more satellite images in the multiple demarcated fields.

5. The system of claim 4, further comprising instructions to upsample the boundary enhancement channel to enhance spatial resolution of at least some boundaries between the multiple demarcated fields.

6. The system of claim 4, wherein determination of the pixel-wise field memberships includes clustering pixels of the boundary enhancement channel together along boundaries where the unit angles align.

7. A method implemented using one or more processors, the method comprising:
obtaining one or more satellite images that capture an area containing multiple demarcated fields, wherein the one or more satellite images each include a plurality of spectral channels;
applying the satellite images as inputs across one or more machine learning models to generate a boundary enhancement channel, wherein each pixel of the boundary enhancement channel is spatially aligned with a corresponding pixel of the one or more satellite images, and wherein each pixel is classified with an angle to a reference location of the field of the multiple demarcated fields that contains the pixel, wherein the reference location comprises a nearest boundary of the field that contains the pixel;
comparing the boundary enhancement channel to ground truth segmentation data; and
based on the comparing, training one or more of the machine learning models.

8. The method of claim 7, wherein the ground truth segmentation data comprises one or more of crop data layer ("CDL") data, common land unit ("CLU") data, crop map of England ("CROME") data, or European Union Land Parcel Identification System ("LPIS") data.

9. A method implemented using one or more processors, comprising:
obtaining one or more satellite images that capture an area containing multiple demarcated fields;
applying the satellite images as input across one or more machine learning models to generate a boundary enhancement channel, wherein each pixel of the boundary enhancement channel is spatially aligned with a corresponding pixel of the one or more satellite images, and wherein each pixel of the boundary enhancement channel is classified with a unit angle to a reference location of the field of the multiple demarcated fields that contains the pixel; and
based on the boundary enhancement channel, determining, and storing in memory, pixel-wise field memberships of pixels of the one or more satellite images in the multiple demarcated fields;
wherein the one or more machine learning models comprise first and second convolutional neural networks in series, wherein output of the first convolutional neural network is applied as input across the second convolutional neural network; and
wherein output of one of the first and second convolutional neural networks comprises pixel-wise crop type classifications, and output of the other of the first and second convolutional neural networks comprises the pixel-wise field memberships.

10. The method of claim 9, wherein the one or more machine learning models comprise an atrous spatial pyramid pooling ("ASPP") layer.

11. A system comprising one or more processors and memory storing instructions that, in response to execution of the instructions by the one or more processors, cause the one or more processors to:
obtain one or more satellite images that capture an area containing multiple demarcated fields;
apply the satellite images as input across one or more machine learning models to generate a boundary enhancement channel, wherein each pixel of the boundary enhancement channel is spatially aligned with a corresponding pixel of the one or more satellite images, and wherein each pixel of the boundary enhancement channel is classified with a unit angle to a reference location of the field of the multiple demarcated fields that contains the pixel; and
based on the boundary enhancement channel, determine, and store in the memory, pixel-wise field memberships of pixels of the one or more satellite images in the multiple demarcated fields;

wherein the one or more machine learning models comprise first and second convolutional neural networks in series, wherein output of the first convolutional neural network is applied as input across the second convolutional neural network; and wherein the output of one of the first and second convolutional neural networks comprises pixel-wise crop type classifications, and output of the other of the first and second convolutional neural networks comprises the pixel-wise field memberships.

12. The system of claim 11, wherein the one or more machine learning models comprise an atrous spatial pyramid pooling ("ASPP") layer.

13. A method implemented using one or more processors, comprising:

obtaining one or more satellite images that capture an area containing multiple demarcated fields;

applying the satellite images as input across one or more machine learning models to generate a boundary enhancement channel, wherein each pixel of the boundary enhancement channel is spatially aligned with a corresponding pixel of the one or more satellite images, and wherein each pixel of the boundary enhancement channel is classified with a unit angle to a reference location of the field of the multiple demarcated fields that contains the pixel; and based on the boundary enhancement channel, determining, and storing in memory, pixel-wise field memberships of pixels of the one or more satellite images in the multiple demarcated fields;

wherein the one or more machine learning models are trained using a weighted combination of two or more of cosine loss on boundary unit angles, cross-entropy loss for boundary pixels, and cross-entropy loss for pixel-wise crop type classifications.

14. A system comprising one or more processors and memory storing instructions that, in response to execution of the instructions by the one or more processors, cause the one or more processors to:

obtain one or more satellite images that capture an area containing multiple demarcated fields;

apply the satellite images as input across one or more machine learning models to generate a boundary enhancement channel, wherein each pixel of the boundary enhancement channel is spatially aligned with a corresponding pixel of the one or more satellite images, and wherein each pixel of the boundary enhancement channel is classified with a unit angle to a reference location of the field of the multiple demarcated fields that contains the pixel; and based on the boundary enhancement channel, determine, and store in the memory, pixel-wise field memberships of pixels of the one or more satellite images in the multiple demarcated fields;

wherein the one or more machine learning models are trained using a weighted combination of two or more of cosine loss on boundary unit angles, cross-entropy loss for boundary pixels, and cross-entropy loss for pixel-wise crop type classifications.

\* \* \* \* \*